United States Patent Office 3,024,260
Patented Mar. 6, 1962

3,024,260
PROCESS FOR THE PRODUCTION OF FATTY HYDROXYALKYLAMIDES
Robert Ernst, Los Angeles, Calif., assignor to Textilana Corporation, Hawthorne, Calif., a corporation of California
No Drawing. Filed Oct. 15, 1959, Ser. No. 846,548
19 Claims. (Cl. 260—404)

This invention relates to the formation and purification of alkanol amides of carboxylic acids. It also relates to the reversible transformation of alkanol amides, alkanol amine esters of the carboxylic acids, or their amides.

It is well known that direct acylation of alkanol amides by the reaction of alkanol amines (hydroxyalkylamines) with carboxylic acid—for example, the amidification of fatty acids by such alkanol amines—produces, in addition to alkanol amides, the alkanol amine esters of the fatty acids and the esters of the alkanol amides.

The reaction products of fatty acids with hydroxyalkylamines have found extensive application in various fields. Until recent years, the products formed by direct condensation of fatty acids and hydroxyalkylamines such as diethanolamine, constituted largely blends of hydroxyalkylamides, complex condensation products of such amides with additional amine, ester amine compounds, ester amide compounds, free amine remaining from excess amine initially charged, amine soap or salts, and, finally, intercondensation products of the amine used.

Thus, a typical direct condensation of the fatty acids and alkanol amines will produce the corresponding alkanol fatty acid amide and amino ester of the fatty acids, the alkanol amine salt or soap of the fatty acid, the alkanol amide ester of the fatty acid, and also complex intercondensation products of the alkanol amine; thus, for example, diethanol amine may intercondense to produce dihydroxy ethyl piperazine.

I have found that I may purify this complex mixture of products produced by such direct condensation reactions at relatively high temperatures and convert the amino esters and amido esters into amides substantially free of ester groups, whether present as amino esters or amido esters.

I have found that I may transform the esters produced by such direct amidification by employing, at a substantially lower temperature, an alkali metal reagent whose role I believe to be catalytic, although I do not wish to be bound by any theory of its activity. The alkali metal is preferably in the form of an alkali metal alcoholate or alkali metal amide.

I have found that the reaction, in the presence of the above catalyst, is reversible; and the transformation of the amide into ester forms is favored at high temperatures; that the transformation of the esters into the amide form is favored at low temperatures.

I prefer, in the amidification reaction, which requires elevated temperatures, to cause the amidification reaction to proceed in the absence of the alkali metal catalyst and to carry out the transformation reaction in a second step at a lower temperature, in the presence of the alkali metal catalyst.

I have also found that it is necessary to have present in the reaction mixture employed in the second stage transformation reaction a labile amino hydrogen in the form of a compound containing a primary or secondary amine radical. Such compound may be a free primary or secondary amine or the amino ester of such primary or secondary amine. In order to obtain desirable conversion of the esters to the amide form, the moles of such primary or secondary amine radical should be at least equal and preferably in excess of the ester carbonyl radical present in the reaction mixture from the first stage of condensation. Since in the direct amidification step some conversion of secondary amines, if such are employed, into tertiary amines or amine complexes, for example substituted piperazines as well as other tertiary amines, occurs, the deficiency may be supplied either by using an excess of the primary or secondary amine in the first condensation stage or by adding such additional amine to the second stage, in order that there be present in the second stage an excess of such primary or secondary amine radicals having a labile amino hydrogen such that the molar ratio of the above amine radical to the ester carbonyl group is not less than 1:1.

In carrying out the primary condensation step, I may also employ an excess of the primary or secondary amine and acylate the hydroxyalkylamine with the carboxylic acid, in the absence of the alkali metal catalyst, and preferably at as low a temperature as convenient to give an amidification reaction at a tolerable rate. The reaction is carried out for a time sufficient to produce a mixture of low acid number, indicating a substantially complete amidification and an esterification of the acid at the temperatures employed. I choose the temperatures to be as low as convenient, as stated above, but sufficiently high, either under atmospheric conditions or under vacuum, so that the water of reaction resulting from the amidification and esterification of the carboxylic acid is removed to produce a product of low free acid and water content.

In the second step, where the above molar ratio of amine group containing the labile hydrogen to the ester carbonyl group is not obtained, I may add additional primary or secondary amine, not necessarily the same as used in the first step; but usually, if sufficient excess amine has been employed in the first stage, such addition is not necessary.

I then add the alkali metal catalyst, preferably at room temperature. I prefer to employ the catalyst in the form of an alcoholate and to maintain this reaction mixture containing the catalyst for a period of time sufficient to cause transformation of the ester groups present. After the transformation has been completed to the degree desired, I may remove the catalyst by an acid wash or by a water wash. However, as will be shown below, if it is desired to stabilize the amide against ester formation, where the temperature of storage is maintained relatively low, I prefer to leave the catalyst in the reaction mixture, for it will continue to lower the ester content.

It is to be noted, however, as I have discovered, that the catalyst will catalyze the retrogression of the amide into the ester form if the temperature of the catalyzed condensation product is raised. However, if the product is to be stored at relatively high temperatures, it is desirable to remove the catalyst, if it is desired to slow down or limit the transformation of the amides into the ester forms.

To illustrate the nature of the transformations, the following reaction scheme employing mono- and dihydroxyalkylamines is presented for purposes of description. It is not intended to be a complete description of the course of the reaction or the relative amounts of products produced. I do not wish to be bound by any theory as to why the processes as I have discovered and have described herein result from this unexpected activity of the catalyst employed.

STAGE I

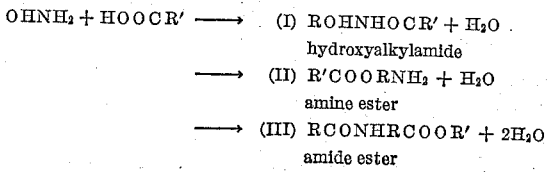

In the above R and R' are alkyl.

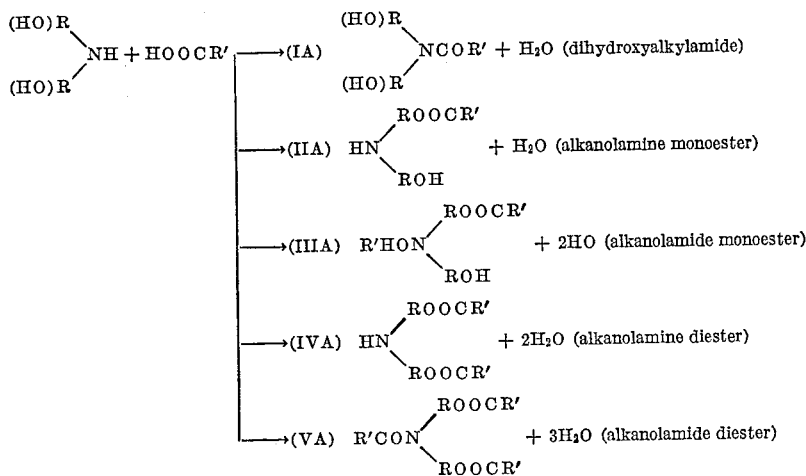

IN STAGE II

II; III→I and IIA; IIIA; IVA; VA→IA

Illustrating the reactions, the following explanatory scheme is in acordance with observed facts as stated herein.

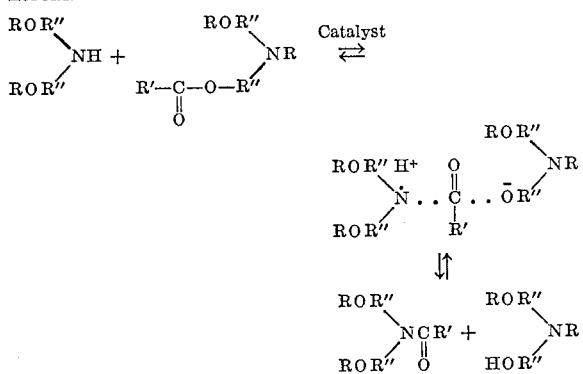

Where

R is H or acyl and when acyl, preferably fatty acyl
R' is fatty alkyl
R" is alkyl and substituted alkyl.

I may employ any of the alkanol primary or secondary amines or any of the polyalkanol primary or secondary amines. Thus, for example, I may use the following monohydroxyl alkyl amines:

mono ethanol amine $HOCH_2CH_2NH_2$,
mono propanol amine $HOCH_2CH_2CH_2NH_2$,
mono iso propanol amine $CH_3CH(OH)CH_2NH_2$,
2-amino-1-butanol $CH_3CH_2CH(NH_2)CH_2OH$,
1-amino-2-butanol $CH_3CH_2CH(OH)CH_2NH_2$,
N-methyl ethanol amine $CH_3NHCH_2CH_2OH$,
N-butyl ethanol amine $CH_3CH_2CH_2CH_2NHCH_2CH_2OH$,
2-amino-2-methyl-1-propanol $CH_3C(NH_2)(CH_3)CH_2OH$,
pentanol amine, hexanol amine, cyclohexanol amine, and other primary or secondary alkanolamines.

I may use the following polyalkanol amines: amino propoxy polyglycol, or the homologous amino alkoxy polyglycols, $HO(CH_2CH_2O)_nCH_2CH_2CH_2NH_2$, where $n$ is 1 or greater than 1;

2-amino-2-methyl-1,3 propane diol
  $OHCH_2C(NH_2)(CH_3)CH_2OH$;
2-amino-2-ethyl-1,3, propane diol
  $HOCH_2C(C_2H_5)(NH_2)CH_2OH$;
diethanol amine $(HOCH_2CH_2)_2NH$;
diisopropanol amine $(CH_3CH(OH)CH_2)_2NH$;
tris hydroxy methyl amino methane $(HOCH_2)_3CNH_2$;
N-methyl glucamine $HOCH_2(CHOH)_4CH_2NHCH_3$.

For some purposes where water soluble amides are desirable, I employ alkanol amines which are themselves water soluble and contain sufficient hydroxy groups or hydroxy and ether groups to impart strong hydrophilic properties to the amine and the desired amide. In this case particularly, the formation of ester amines or ester amides, and particularly ester amides, would impair the hydrophilic characteristics of the end product.

Where, however, low water solubility or even hydrophobic characteristics are desired, as, for example, in opalescing or pearlizing compounds, I may employ in the first stage condensation hydroxy alkyl amines which are hydrophobic in nature, as, for example, high molecular weight alkanol amines, e.g., the hydroxy derivatives of the primary and secondary fatty amines, i.e., $C_6$ to $C_{18}$ hydroxy fatty amines, for example, hydroxy ethyl laurlyamine. In such case I may employ the transformation reaction to obtain a conversion of the amide to the ester amide, as described below.

The above esterification and amidification reactions are characteristic of the carboxyl group, and the transformation of their amides and esters described above will apply to such esters and amides of any compound whose carboxyl group is sufficiently reactive to form esters and amides as described above.

The preferred carboxylic acids are fatty acids having from 6 to 18 carbon atoms; both saturated as well as unsaturated acids can be used. Especially preferred are capric ($C_{10}$), lauric ($C_{12}$) and myristic ($C_{14}$) carboxylic acids and mixtures thereof, such as coconut fatty acids and babassu, cohune, murumuru and palm kernel acids, all of which contain substantial percentages of lauric and myristic acid. These acids are particularly useful in the formation of amides intended as foaming agents and foam persistors. Oleic and linoleic acid derivatives have some highly pronounced detersive properties, while palmitic and stearic derivatives find great utility as opacifiers, pearlescing and softening agents in various cosmetic preparations and liquid detergents.

It is an object of this invention to produce hydroxyalkylamides substantially free of esters of the hydroxy amines or hydroxy amides.

Another object is the production of substantially pure hydroxyalkylamides employing readily available starting materials, such as the fatty acids, and with minimum formation of by-products.

A particular object is the provision of novel procedure for reacting with facility readily available fatty acids with hydroxyalkylamines to form fatty hydroxyalkylamide condensation product in the absence of any significant amount of ester by-products.

It is a further object of my invention to convert the complex mixture of amides, amino esters and amido esters produced by high temperature acylation of an alkanol primary or secondary amine into an amide substantially free of ester groups.

It is a further object of my invention to cause this conversion to take place at a lower temperature than was maintained in the amidification reaction and to carry this transformation out in the presence of an alkali metal catalyst.

It is a further object of my invention to employ in the reaction mixture, during the transformation reaction, a mixture of such catalyst and condensation products substantially free of acid and moisture in amounts which would deactivate the catalyst.

It is a further object of my invention to employ in the second transformation reaction at least a molar equivalent and preferably a molar excess of the amine radical, containing a labile hydrogen, over the ester carbonyl radical, whether present in the form of ester amine or as a free amine or as soap or salt of the amine.

In the preferred embodiment of my invention, in the first step referred to above, I condense the fatty $C_6$ to $C_{18}$ carboxylic acids as stated above with a primary or secondary hydroxy amine, such as stated above, using at least stoichiometric proportions of the reactants to form the amides, and preferably utilizing an excess of the amine in the reaction. The amount of excess amine to be employed will vary from compound to compound, depending upon its reactivity, and the rate of final transformation of the esters into the amide forms will be the greater the higher the excess. However, this effect upon the rate of the transformation reaction is not a linear function of the excess; and there is, therefore, a practical upper limit to the excess of the amine which may be employed. I have found that an excess of from about .01 mole to about .5 mole, i.e., 1.01 to 1.5 moles of amine radicals to the moles of carboxyl carbonyl radicals, will, depending upon the reactivity of the alkanol amine, be a useful range, as will be more fully set forth below. However, I may use higher excess, up to, for example, 10 moles of amine to one mole of the carboxyl carbonyl radical and obtain some improvement, but the increase does not compensate for the disadvantage resulting from the use of such high excess of amines which acts as a diluent in the mixture.

Since I may transform the ester radical by my second step, the excess, when employed in the first step, is primarily useful in the first step to complete the reaction between the acid and the amine, and it will thus also provide the required excess in the second step. However, the desirable excess of the amine in the second step may be supplied by adding the excess in the second step.

In order to produce a finished hydroxyl amide product of high purity and substantially free of ester radical by my two-step process, I treat the product from the first step after the acid content of the reaction in step 1 has fallen to about 5% of the reaction mixture and below, and preferably 1% and below, by a second step to be described below.

Where the rate of the mixed amidation-esterification reaction is found to be too low, one may employ greatly reduced pressures to speed up the conversion of the free fatty acid by removing water as formed. The temperature is held as low as possible during the first step, not only to obtain finished products of best possible color and odor, but also particularly to avoid formation of amine complexes and specifically the formation of tertiary amines. Since formation of minor amounts of tertiary amines is difficult to avoid during this first step of the condensation procedure, particularly where the polyhydroxy alklamines are employed, the use of a small excess of hydroxyalkylamine over stoichiometric amounts is resorted to or, alternatively, additional hydroxyalkylamine may be added during step two, as has been referred to above. However, the reaction is more rapid at high temperature and becomes intolerably prolonged if the temperature is too low, as will be more fully described below. At the temperatures which are practical to employ in this stage, I desire not to employ the alkali metal catalyst employed in Stage 2, since, as was stated above and as will be more fully shown below, the catalyst at such high temperatures catalyzes the formation of ester forms.

Finishing the reaction of step one under vacuum or by strong purging with an inert atmosphere, or both of the aforementioned procedures used simultaneously, will be found useful not only in quickly reducing the free fatty acid content but also in eliminating the entrained water which has developed during the condensation, which, if permitted to remain in the product, will greatly reduce the effectiveness of the catalyst used during the second operation involving the conversion of the ester amines and ester amides formed in step one, into the hydroxyalkylamides desired.

It will be found that the aforementioned condensation of step one can readily take place and be carried to conclusion at temperatures of about 120° to about 180° C., depending upon the amine used and whether or not such condensation is carried out under reduced pressures. Wherever possible, it is desirable to carry out this reaction below about 180° C. and preferably below about 160° C. so as to minimize the formation of the tertiary amine complexes. Undesirable color bodies will also be avoided by keeping the temperature at the lowest possible level.

The fatty acid and the amine may be charged at once into the reactor, and in some cases it will be found favorable to heat the amine to reaction temperatures and to add the fatty acid gradually, particularly where amines of higher melting points are involved or where a tendency exists to form soap gels of relatively high liquification temperature. The aforementioned conditions could easily result in excessive foaming or even in "boil over." Once the mixture of hydroxyalkylamides, esters of such amides and ester amines has been formed by the reaction, and the free fatty acid content has been reduced as much as possible, the resultant product is cooled, preferably to below 100° C., or it may even be cooled to room temperature where melting point and viscosity permit.

The product is then analyzed for free primary and/or secondary amines and ester compounds present. The ester content can most rapidly be determined by spectrometric procedures in the infrared. The ester carbonyl absorption peak will be found at approximately 5.75 microns, while the amide carbonyl will peak at approximately 6 to 6.2 microns, depending on the amide. Alternatively, the amine ester and amide ester content may be found by wet method analysis, from relative proportions between combined amine and combined fatty acid. The latter procedure is, however, extremely time consuming since, for instance, it requires the analytical steps as outlined by the method of Kroll and Lennon, Pro. Sci. Sec. Toilet Goods Assoc. 25, 37, 1956.

STAGE II

The primary or secondary amine radical content, depending on whether primary or secondary hydroxyalkylamine had been used as a starting material, is then determined in the condensation product of step one (see Kroll and Lennon, supra). This figure will include primary or secondary amine present as ester amine. If insufficient primary or secondary amine was present in the condensation product of step one, additional primary or secondary amine is then added to establish the ratios of amine to ester carbonyl stated above.

It has been found that, as a practical matter, the amount of excess amine over fatty acid which generally is required according to my process can range from about 1% to about 50% in excess of stoichiometric molar proportions based on the amount of fatty acid employed in stage 1. The amount of such excess amine employed will vary with the specific reactants employed and the reaction conditions. Preferably, about 10% to about 40% excess of amine is employed, depending on the reactants used in the first stage.

The entire excess of amine to be employed can and preferably is added in step one of the process described above. However, if desired, only the stoichiometric or equivalent amount of amine can be used in step one and the excess of amine added in step two, or a portion of the excess amine, say 20% of such excess, where the total excess is to be, say, 40%, can be added in step one and the remaining excess of amine, e.g. 20%, added in step two, to convert the amine esters and amide esters in the reaction product of step one to amides.

There is then added a sufficient excess of catalyst as alkali metal, alkali metal amide, or alkali metal alcoholate to retain a measurable amount as active catalyst, since a portion of the catalyst will be consumed in neutralizing the free fatty acid still remaining in the product and will react with any moisture present in the product produced in step one. I may employ as catalyst $NaOCH_3$, $NaOC_2H_5$, $NaNH_2$, $KOCH_3$, $KOC_2H_5$, $KNH_2$, or the alkali alcoholate of the hydroxy alkyl amine employed in the condensation Stage 1 or added in Stage 2. Alkali metal may be used, and this will react with excess alkanolamine to form the corresponding alcoholate of the amine. The total amount of catalyst generally added to the reaction product of step one can be in the range of about 0.05% to about 5%, calculated as the alkali metal, by weight of the reaction product, depending on the amount of free fatty acid content and the water content of the reaction product, and sufficient to provide for at least 0.05% to 1% by weight of the catalyst (calculated as the metal and unreacted with free acid or water which may be present) during the reaction.

The amidation involved in step two, converting ester amines and ester amides into amides, appears to depend upon the presence of alkali metal as catalyst. The alkoxide ion produced by the alkali metal alcoholate is particularly effective for this transformation reaction. Sodium methylate or methoxide is a very convenient form of catalyst. It may be introduced into the reaction product of step one as a powder or, where more convenient, as an alcoholic solution, such as in solution in methanol.

In the latter case, after the catalyst has been properly dispersed through the reaction mass, the methanol may be removed where desired. This is most conveniently done by application of a vacuum while the reaction mass is still at a somewhat elevated temperature. The catalyst can also be readily introduced at room temperature, and the alcohol resulting from decomposition of, for instance, sodium methylate, or the additional alcohol introduced as solvent, need not be removed. The low temperatures favor the transformation of the esters into amides. Temperature of the reaction in the second step of the process is generally maintained below about 100° C., preferably between about 80° C. and ambient temperature, for example, 20° C. The temperature may run lower and below the solidification point of the mixture, which may be lower than ambient temperature of about 20° to 25° C.

The following examples will more precisely illustrate the process described above. These examples are in no way intended to serve as limitations of the invention.

*Example 1*

Step 1.—Commercially pure lauric acid, Acid No. 280.5, 1,200 gms. (equal to 6 mols) was charged into a 3,000 ml. reaction flask, equipped with thermometer and nitrogen inlet tube, Claisen distilling head, condenser, Dry Ice trap and mechanical vacuum pump.

Diethanolamine, 882 gms., equal to 8.4 mols was added. The reaction mass was stirred by a mechanical device and the temperature brought to 290° F. After four hours, the acid number had dropped below 15 and 124 gms. of water had collected. The vacuum was applied, holding the temperature between 280°–300° F. The atmospheric pressure was gradually reduced to 25 mm. of mercury over a period of two hours, after which the content of free fatty acid had fallen to below 1%. An acid number of 0.6 was obtained. The amount of distillate collected weighed 136 gm. The distillate contained some amine soap and free amine, and only a little more than the theoretical amount of water had been collected. A four gram sample of this compound was dissolved in 100 ml. of chloroform, and the percent ester contained was calculated from the optical density obtained by conventional infrared spectrometric method, using the calibration obtained from a pure sample of the mono lauroyl ester of (dihydroxy ethyl) lauroyl amide. The ester content was 27% by weight, expressed as the mono lauroyl ester of lauroyl (dihydroxy ethyl) amide. The amine equivalent weight by titration was found to be 634, and sufficient diethanolamine and amine ester was found still remaining in the product to satisfy the conversion of the esters present into amides.

Step 2.—The product was now cooled, and one small portion was set aside for observation. The other portion was treated as follows:

When the temperature had fallen to about 150° F., 38 gms. of a 25% solution of sodium methylate in methanol was added to about 1900 gms. of the mixture produced above. The vacuum which had been broken off after reaching the desired low acid value was started up again, the pressure reduced once again to 25 mm., and the temperature maintained under constant agitation at a temperature of 150°–165° F.

After 2½ hour at about a temperature of 160° F., infrared scanning showed that the ester content had fallen to 11.2% resultant compound. Nitrogen purging had been resorted to during the entire operation in order to promote removal of volatiles (water and methanol) as well as to preserve the light color. The batch was then cooled and maintained at room temperature, about 70° F., for 10 days, and was sampled periodically.

The following Table I gives the results during the first stage amidification—esterification reaction, observed on the sample set aside as above.

TABLE I

| Note Stage 1 | Time, hours | Temp., ° F. | Ester content, percent [1] |
| --- | --- | --- | --- |
|  | 0 |  | 0 |
|  | 3 | 290 | 8.75 |
|  | 5 | 290 | 19.0 |
| Vacuum 29″ applied | 6.5 | 290 | 20.25 |
| Do | 8 | 290 | 27.25 |
| Do | 9 | 290 | 27.25 |
| Left overnight to cool | 24 | 290–86 | 21 |

[1] Ester content calculated as the mono lauroyl ester of lauroyl (dihydroxyethyl) amide.

The product was divided into two samples.

The Sample 1 was allowed to remain at room temperature for 3 days after it had reached the 21% ester content as above. After 3 days standing, the ester content was measured at 20.75%, showing substantially no change.

The schedule of temperature and times and ester content of Example 1, Step 2, is given in Table II, time counted at zero at end of 24 hours in Table I when ester content was 21%.

TABLE II

| Note Stage 2 | Time | Temp., °F. | Ester content, percent |
|---|---|---|---|
| Catalyst added | 0 | 150 | 21 |
|  | ½ hour | 150 | 15 |
| Temperature raised and vacuum 29" applied. Then | 2½ hours | 160 | 11.25 |
| Vacuum removed, cooled to room temp. | 3 days | Room temp | 6 |
| Maintained at room temperature and atmospheric pressure. | 5 days | do | 5.4 |
|  | 6 days | do | 5 |
|  | 10 days | do | 4.2 |

The sample, after 10 days standing, was also analyzed by chemical methods referred to above, with the following results:

Amine equivalent weight _____ 700
Ash (expressed as $Na_2O$) _____percent__ 0.30
Free amine (expressed as di (hydroxy ethyl) amine)
_____percent__ 14
Free fatty acid _____do____ 0
Soap content (expressed as Na salt of lauric acid)
_____percent__ 0.96
Ester content (expressed as amide monoester)
_____percent__ 4.5
Color (Hellige VCS) _____ <1

The product so produced proved suitable in every way as a high quality detergent intermediate, foaming agent, and foam stabilizer when compared with like formulations containing di (hydroxy ethyl) lauroylamide prepared from commercially pure methyl laurate.

Example 2

The process described in Example 1, when carried through catalytic step 2 at an elevated temperature of 160° F. for 2½ hours under the vacuum of 29 inches of water, yielded a product containing 11.2% of ester groups, calculated and determined as in Example 1.

In Example 1, a 40 molar percent excess of diethanolamine was employed, i.e., a ratio of 1.4 mols of diethanolamine per mole of acid. The same process was carried out, using 1.1, 1.2 and 1.3 moles of diethanolamine per mole of acid. Stage 1 and Stage 2 were carried out in the same manner as in Example 1, through the 2½-hour heating at 160° F. under the 29 inches of vacuum in Stage 2. The various products were each aged at room temperature, and the ester content determined and calculated in the same manner as in Example 1, with the following results as stated in Table III. When the 1.1 moles were employed, analysis showed that no free secondary amine group was present in the product due to the complexing of the small excess of the amine used in Stage 1. The percent ester is the ester value as determined by infrared method and calculated and reported as described in connection with Example 1. Aging time at room temperature is measured after the completion of the 2½-hour heating at 160° F. under a vacuum of 29".

TABLE III

| Time | Percent ester |||| 
|---|---|---|---|---|
| | Moles of alkanolamine per mole of acid initially charged in Step 1 |||| 
| | 1.1 | 1.2 | 1.3 | 1.4 |
| At end of heating | Percent 35.2 | Percent 21.25 | Percent 16.75 | Percent 11.2 |
| 3 days | | 19.75 | | 6.0 |
| 5 days | | | 9.75 | 5.4 |
| 6 days | | | | 5 |
| 10 days | | | | 4.25 |
| 17 days | | 18.8 | | |
| 20 days | 35.2 | | | |

It will be observed that not only is the level of the ester content lower the higher the ratio of the amine to acid, but that the rate of removal of the ester during aging is the greater the greater is the mol ratio. Compare, for example, the results with 1.4 moles with those obtained with 1.2 and 1.1 moles.

These results indicate that with diethanol amine it is desirable to employ in excess of 1.2 moles of alkanol amine radical to 1 mole of carboxyl carbonyl radical and about 1.5 moles of alkanol amine radical to 1 mole of carboxyl carbonyl radical will be a practical upper limit. A larger excess of the amine will not materially improve the transformation and will remain in the product as a diluent. The exact ratio will depend on the nature of the acid employed and, as will be shown below, also on the nature of the alkanol amine where other than diethanol amine is employed. However, those skilled in the art may determine the most advantageous values by the simple test described in Example 2.

Example 3

The reversibility of the amide ester transformation catalyzed as described above, and the effect of temperature on this reaction, will appear from the results of Example 3.

The product produced in Example 1 was aged at room temperature beyond the ten-day period, and the ester content dropped from 4.2% to 2.84%. The product was then divided into four samples, and each sample was maintained at a different but constant temperature. The ester content was determined for each sample after the first, second and third day of treatment, the determination being by the infrared method, and the product is reported in the same manner as given in connection with Example 1. The results are given in Table IV.

TABLE IV

| Temp., °C. | Ester content after— ||||
|---|---|---|---|---|
| | 0 | 1 Day | 2 Days | 3 Days |
| 50 | Percent 2.84 | Percent 8.53 | Percent 6.97 | Percent 6.34 |
| 88 | 2.84 | 13.9 | 14.1 | 13.7 |
| 140 | 2.84 | 21.5 | 21.2 | 22.4 |

The higher the temperature the higher the rate of conversion of the amide into ester forms. It is thus desirable, where the product is to be maintained substantially free of ester forms for prolonged periods of time and where the catalyst is not removed from the reaction product, to maintain the product at low temperatures, preferably below 50° C.

Where it is desired to keep the product above 50° C., and particularly in the order of 80° C. and higher, it will be found desirable to remove the catalyst as, for example, by adding water. This is illustrated in the following Example 4.

Example 4

The product produced in Example 1, after ten day storage and having an ester content of 4.2%, was sampled, and sample 1 was maintained as in Example 3 at 88° C. with no water added, and the ester content was determined after 4 hours and after 24 hours. Sample 2 was the same as sample 1, but it had 1% by weight of water added, and it was treated in the same manner as sample 1. Sample 3 was the same as sample 1, but it had 5% by weight of water added, and it was treated in the same manner as samples 1 and 2. The following Table V gives the ester content as determined and reported as in Example 1, and obtained after 4 and 24 hours of heating.

TABLE V

| Time | Temp., °C. | Ester content | | |
|---|---|---|---|---|
| | | 0% water added | 1% water added | 5% water added |
| | | Percent | Percent | Percent |
| 0 | 88 | 4.2 | 4.2 | 4.2 |
| 4 hours | 88 | 13.9 | 7.04 | 5.59 |
| 24 hours | 88 | 14.9 | 9.87 | 7.33 |

It will be seen that the addition of water, which reacts with the catalyst, suppresses the reverse transformation of the amide to the ester forms at higher temperatures above 50° C., for example, about 70° C. to about 150° C. Consequently, in order to repress the transformation where high temperature storage is to be used, removal of the catalyst by washing with water or acid will stabilize the amide and repress the generation of ester forms. However, where it is desired to convert alkanol amides of the fatty acids into fatty acid esters of the alkanol amines and alkanol amides, the corresponding amides may be so converted by maintaining them at temperatures of about 70° to about 150° C. in the presence of the catalyst previously described.

If the ester form is to be maintained and the transformation into the corresponding amide is to be suppressed, then it will be desirable to remove the catalyst, as is evident from the stability of the ester forms in the absence of the catalyst, as shown in Example 1 and the results in connection with Example 3.

The reactions illustrated in Examples 1 to 3 are applicable also to the various acids and alkanol amines listed above as suitable, and each may be used in equivalent proportions to the proportions given in Examples 1 to 3 or Examples 5 and 6 below with similar effect. The specific rates and percentages of esters obtained at the various temperatures and times will differ, as will the excess amine required to produce amides of low ester content, as can be seen from Example 5; but the reactions and products produced will be equivalent, the products being of substantially the same constitution, differing as the alkanol amine and acid radicals differ.

The following examples will illustrate this similarity. They may be repeated for each combination of acid and alkanol amine referred to above. This is unnecessary, since those skilled in the art will readily know how to react the various alkanol amines and acids not specifically referred to in the specific examples but included within the general description of this specification.

*Example 5*

PREPARATION OF FATTY AMIDO TRIS(HYDROXY METHYL) METHANE

A mixture of capric, lauric and myristic acids containing approximately 90% lauric acid having a molecular weight of 203 . . . 1,218 gm., corresponding to 6 mols, was warmed in a dropping funnel leading to a reaction flask, equipped as the reaction vessel described in Example 1. 6.6 mols tri hydroxy methyl aminomethane was charged into the reaction vessel in crystalline form and was melted at about 170° C. under purging with nitrogen. The pressure was now reduced to 150 mm., and the molten acid was added over a period of about 2 hours, while distilling off the water. The temperature of the batch was held at about 170° C. during this period and pressure maintained at 150 mm., while the vapor temperature in the Claisen column rose to 75° C. The pressure was now gradually reduced to 25 mm. while the temperature was dropped to about 145° C.–150° C. for a period of 5 hours, at which time the acid number was found to be 0.86.

The batch was now cooled to room temperature and separated into two samples, 1 and 2. Although only 10% excess of commercially pure tris (hydroxy methyl) aminomethane had been initially charged, the analysis of the samples proved that sufficient free primary amine was present to amidate the esters still present. Sample 2 of the crude product obtained in step 1 was remelted and ½% by weight of sodium methylate (powder) 95% purity, based upon the reaction product, was added while the material began to liquify. The batch was agitated for about 2 hours, while at 25 mm. of atmospheric pressure and at a temperature of 240°–250° F. The vacuum was resorted to, so that any further condensation water which might develop would be removed at once. After cooling, both samples were stored for two weeks at room temperature. Each sample was then scanned under infrared, and Sample 1 showed a marked ester content, and sample 2 contained substantially no ester, as shown by the absence of the ester carbonyl peak at 5.75µ.

This may be compared with the results of Example 1, which showed similar results. It is to be noted that, whereas with the diethanolamine the 10% molar excess was inadequate, 10% molar excess in the case of the tris (hydroxy methyl) amino methane had the effect better than the 40% excess in the case of diethanolamine.

*Example 6*

Into a 3,000 mm. reaction vessel, equipped as in Example 1, was charged 715 gm. of 2-amino-2-ethyl 1,-3 propane diol, equivalent to 6 mols. Under mild purging with nitrogen, the amine was heated to 295°–300° F. and there was added gradually over a period of 4½ hours 1,020 gm. of melted lauric acid, 90% purity, having an equivalent weight of 204, therefore, 5 mols. During the course of this addition, the temperature was held between 295°–300° F. and the vapor temperature in the Claisen distilling head slowly rose from 45°–91° C. as water of reaction distilled over. After completion of the addition of the acid, heating was continued at 300° F. for a period of 12 hours, after which time the acid number had fallen to 3.76. The batch was now checked for ester content and was found to contain about 6% ester, calculated as the amide mono ester. The analysis proved sufficient amine present to carry out the second step without further addition of amine reagent. There was therefore added at 170° F. while in the cooling cycle, 2% based on the weight of the total batch of a 25% solution of sodium methylate in methanol (0.5% on 100% basis) and while continuing to agitate, the batch was permitted to cool slowly to room temperature. A sample analyzed at the end of this cooling cycle (amounting to 3½ hours) showed zero acid number and zero ester content, the acid number, of course, vanishing as a result of neutralization with the sodium methoxide, while the ester content completely disappeared as a result of the transformation procedure.

The results are similar to those of Example 5. Compare this effect of the 20% excess when employed in Example 1 with the 20% and 40% excess in Example 2.

The excess required thus will differ with the reactivity of the amine. However, an excess is required, and the amount of the excess is easily determined by the tests specified. In general, it will be found that alkanolamines having primary amino groups will produce lower ester content in Stage 1 and require a smaller excess of amino groups than do secondary amino compounds. If storage does not produce the required low ester content, additional amine may be added, and in subsequent batches the excess so determined may be employed in Stage 1 or added to Stage 2.

While I have described a particular embodiment of my invention for purposes of illustration, it should be understood that various modifications and adaptations thereof may be made within the spirit of the invention as set forth in the appended claims.

I claim:

1. A process for producing hydroxyalkylamides which comprises condensing in a first step a fatty carboxylic acid with an alkanol amine containing a labile hydrogen and at a temperature of about 120° to about 180° C., continuing the reaction until the fatty acid content of the reaction product is reduced to below about 5% by weight of said reaction product, forming a reaction product comprised predominantly of a mixture of hydroxyalkylamides and a member of the group consisting of fatty acid esters of the hydroxyalkylamides and fatty acid esters of the hydroxyalkylamines, and thereafter adding to the reaction product a catalyst of the group consisting of alkali metal, alkali amide and alkali alcoholate in an amount in excess of that required to neutralize any free fatty acid remaining in the product and to compensate for moisture present in the reaction product, and thus forming a mixture of said reactants containing free catalyst remaining in said reaction product, reacting said mixture at reduced temperature below about 100° C. in the presence of compounds containing an amine radical containing a labile hydrogen, said amine radical being in excess over the molar concentration of ester carbonyl in the said mixture, converting the major portion of said esters to the corresponding amides, and forming a reaction product consisting essentially of hydroxyalkylamide, and having an ester content not substantially above 5% by weight of the reaction product and a minor amount of free catalyst.

2. A process for producing hydroxyalkylamides substantially free of compounds containing ester radicals, which comprises condensing in a first step a fatty carboxylic acid having from 6 to 18 carbon atoms with an amine of the formula

where R is a member of the group consisting of hydrogen, alkyl and hydroxyalkyl, and R' is a hydroxyalkyl, said amine being used in molar amount in the range of about 1.01 to about 10 times the molar quantity of said fatty acid, in the absence of catalyst at a temperature of about 120° to about 160° C. and at reduced pressure, continuing the reaction until the fatty acid content of the reaction product is reduced to below about 5% by weight of said reaction product, forming a reaction product comprising predominantly a mixture of hydroxyalkylamides and a member of the group consisting of said fatty acid esters of hydroxyalkylamides and fatty acid esters of said hydroxyalkylamines, and in a second step adding to the reaction product a catalyst of the group consisting of alkali metal, alkali amide and alkali alcoholate in an amount in excess of that required to neutralize any free fatty acid remaining in the product and to compensate for moisture present in the reaction product, leaving free catalyst remaining in said reaction product, reacting said mixture at reduced temperature and forming a reaction product consisting essentially of hydroxyalkylamide, and having an ester content not substantially above 5% by weight of the reaction product and a minor amount of free catalyst.

3. A process for producing hydroxyalkylamides substantially free of compounds containing ester radicals, which comprises condensing in a first step a fatty carboxylic acid having from 6 to 18 carbon atoms with a molar excess of dialkanolamine in the absence of catalyst at a temperature of about 120° to about 160° C. and at reduced pressure, continuing the reaction until the fatty acid content of the reaction product is reduced to below about 5% by weight of said reaction product, forming a reaction product containing a mixture of compounds containing esters and amide groups and alkanolamine groups, cooling the reaction product to below about 100° C., and in a second step adding to the reaction product a catalyst of the group consisting of alkali metal, alkali amide and alkali alcoholate in an amount in excess of that required to neutralize any free fatty acid remaining in the product and to compensate for moisture present in the reaction product, leaving free catalyst remaining in said reaction product, continuing the reaction at reduced temperature, converting the major portion of said esters to the corresponding amides, and forming a reaction product consisting essentially of hydroxyalkylamide, and having an ester content not substantially above 5% of the reaction product calculated as the alkanol amide monoester of said acid, and a minor amount of free catalyst.

4. A process for producing hydroxyalkylamides which comprises condensing in a first step a fatty carboxylic acid with an alkanol amine containing a labile hydrogen and, at a temperature of about 120° to about 180° C., continuing the reaction until the fatty acid content of the reaction product is reduced to below about 5% by weight of said reaction product, and forming a reaction product comprised predominantly of a mixture of hydroxyalkylamides and fatty acid esters of the hydroxyalkylamides and fatty acid esters of the hydroxyalkylamines, and thereafter adding to the reaction product a catalyst of the group consisting of alkali metal, alkali amide and alkali alcoholate in an amount in excess of that required to neutralize any free fatty acid remaining in the product and to compensate for moisture present in the reaction product, and thus forming a mixture of said reactants containing free catalyst remaining in said reaction product, reacting said mixture at reduced temperature below about 100° C. in the presence of compounds containing an amine radical containing a labile hydrogen, said amine radical being in excess over the molar concentration of ester carbonyl radicals in the said mixture, converting the major portion of said esters to the corresponding amides, and forming a reaction product consisting essentially of hydroxyalkylamide, and having an ester content substantially less than in said reaction product produced in said first step, and containing a minor amount of free catalyst.

5. The process as defined in claim 4, wherein the molar amount of said hydroxyalkylamine in said first step is about 1.01 to about 1.5 times the moles of fatty acid.

6. In the process of claim 4, in which the fatty carboxylic acid contains carbon atoms in the range of about $C_8$ to $C_{16}$.

7. In the process of claim 5, in which the fatty carboxylic acid contains carbon atoms in the range of about $C_8$ to $C_{16}$.

8. A process for producing hydroxyalkylamides which comprises condensing in a first step a fatty carboxylic acid with an alkanol amine containing a labile hydrogen and, at a temperature of about 120° to about 180° C., continuing the reaction until the fatty acid content of the reaction product is reduced to below about 5% by weight of said reaction product, forming a reaction product comprised predominantly of a mixture of hydroxyalkylamides and a member of the group consisting of fatty acid esters of the hydroxyalkylamides and fatty acid esters of the hydroxyalkylamines, and thereafter adding to the reaction product a catalyst of the group consisting of alkali metal, alkali amide and alkali alcoholate in an amount in excess of that required to neutralize any free fatty acid remaining in the product and to compensate for moisture present in the reaction product, and thus forming a mixture of said reactants containing free catalyst remaining in said reaction product, adding additional amine containing a labile hydrogen, and establishing in said mixture a molar concentration of amine radical containing labile hydrogen at least equal to the molar concentration of ester carbonyl radicals, and reacting said mixture at a reduced temperature below about 100° C., and converting the major portion of said esters to the corresponding amides, and forming a reaction product consisting essentially of hydroxyalkylamide, and having an ester content substantially less than that of the reaction product produced in said first step, and containing a minor amount of free catalyst.

9. The process as defined in claim 8, wherein the molar amount of said hydroxyalkylamine in said first step is about 1.01 to about 1.5 times the moles of fatty acid.

10. In the process of claim 8, in which the fatty carboxylic acid contains carbon atoms in the range of about $C_8$ to $C_{16}$.

11. In the process of claim 9, in which the fatty carboxylic acid contains carbon atoms in the range of about $C_8$ to $C_{16}$.

12. A process for producing hydroxyalkylamides substantially free of compounds containing ester radicals, which comprises condensing in a first step a fatty carboxylic acid having from 6 to 18 carbon atoms with an amine of the formula

where R is a member of the group consisting of hydrogen, alkyl and hydroxyalkyl, and R' is a hydroxyalkyl, said amine being used in molar amount in excess of the molar quantity of said fatty acid, at a temperature of about 120° to about 160° C. and at reduced pressure, continuing the reaction until the fatty acid content of the reaction product is reduced to below about 5% by weight of said reaction product, forming a reaction product comprising predominantly a mixture of hydroxyalkylamides and a member of the group consisting of said fatty acid esters of hydroxyalkylamides and fatty acid esters of said hydroxyalkylamines, and in a second step adding additional aforesaid amine of the formula specified above to establish in said mixture a ratio of at least 1 mole of said amine to 1 mole of ester carbonyl radical in said mixture, adding to the reaction product a catalyst of the group consisting of alkali metal, alkali amide and alkali alcoholate in an amount in excess of that required to neutralize any free fatty acid remaining in the product and to compensate for moisture present in the reaction product, leaving free catalyst remaining in said reaction product, reacting said mixture at reduced temperature and forming a reaction product consisting essentially of hydroxyalkylamide, and having an ester content substantially less than in said reaction product produced in said first step, and containing a minor amount of free catalyst.

13. A process for producing hydroxyalkylamides substantially free of compounds containing ester radicals, which comprises condensing in a first step a fatty carboxylic acid having from 6 to 18 carbon atoms with an amine of the formula

where R is a member of the group consisting of hydrogen, alkyl and hydroxyalkyl, and R' is a hydroxyalkyl, said amine being used in molar amount in excess of the molar quantity of said fatty acid, at a temperature of about 120° to about 160° C. and at reduced pressure, continuing the reaction until the fatty acid content of the reaction product is reduced to below about 5% by weight of said reaction product, forming a reaction product comprising predominantly a mixture of hydroxyalkylamides, fatty acid esters of hydroxalkylamides and fatty acid esters of said hydroxyalkylamines, and in a second step adding to the reaction product a catalyst of the group consisting of alkali metal, alkali amide and alkali alcoholate in an amount in excess of that required to neutralize any free fatty acid remaining in the product and to compensate for moisture present in the reaction product, leaving free catalyst remaining in said reaction product, adding additional aforesaid amine of the formula specified above to establish in said mixture a ratio of at least 1 mole of said amine to 1 mole of ester carbonyl radical in said mixture, reacting said mixture at reduced temperature and forming a reaction product consisting essentially of hydroxyalkylamide, and having an ester content substantially less than that in the reaction product produced in said first step, and containing a minor amount of free catalyst.

14. A process for producing hydroxyalkylamides substantially free of compounds containing ester radicals, which comprises condensing in a first step a fatty carboxylic acid having from 6 to 18 carbon atoms with an amine of the formula

where R is a member of the group consisting of hydrogen, alkyl and hydroxyalkyl, and R' is a hydroxyalkyl, said amine being used in molar amount in the range of about 1.01 to about 10 times the molar quantity of said fatty acid, at a temperature of about 120° to about 160° C. and at reduced pressure, continuing the reaction until the fatty acid content of the reaction product is reduced to below about 5% by weight of said reaction product, forming a reaction product comprising predominantly a mixture of hydroxyalkylamides and fatty acid esters of hydroxyalkylamides and fatty acid esters of said hydroxyalkylamines, and in a second step adding to the reaction product a catalyst of the group consisting of alkali metal, alkali amide and alkali alcoholate in an amount in excess of that required to neutralize any free fatty acid remaining in the product and to compensate for moisture present in the reaction product, leaving free catalyst remaining in said reaction product, reacting said mixture at reduced temperature and forming a reaction product consisting essentially of hydroxyalkylamide, and having an ester content substantially less than that of the reaction product produced in said first step, and a minor amount of free catalyst.

15. A process for producing hydroxyalkylamides substantially free of compounds containing ester radicals, which comprises condensing in a first step a fatty carboxylic acid having from 6 to 18 carbon atoms with a molar excess of dialkanolamine at a temperature of about 120° to about 160° C. and at reduced pressure, continuing the reaction until the fatty acid content of the reaction product is reduced to below about 5% by weight of said reaction product, forming a reaction product containing a mixture of compounds containing esters and amide groups and alkanolamine groups, in which the molar quantity of alkanolamine groups is at least equal to the molar quantity of ester groups, cooling the reaction product to below about 100° C., and in a second step adding to the reaction product a catalyst of the group consisting of alkali metal, alkali amide and alkali alcoholate in an amount in excess of that required to neutralize any free fatty acid remaining in the product and to compensate for moisture present in the reaction product, leaving free catalyst remaining in said reaction product, continuing the reaction at reduced temperature, converting the major portion of said esters to the corresponding amides, and forming a reaction product consisting essentially of hydroxyalkylamide, and having an ester content substantially less than that of the reaction product produced in said first step and calculated as the alkanol amide monoester of said acid, and containing a minor amount of free catalyst.

16. A process as defined in claim 15, wherein said fatty acid is lauric acid and said amine is diethanolamine, and said catalyst is sodium methylate.

17. In the process of claim 16, in which the ratio of the moles of alkanol amine radical to the moles of carboxyl carbonyl radicals is in excess of about 1.2 moles of alkanol amine radical to 1 mole of carboxyl carbonyl radical.

18. In the process of claim 16, in which said molar excess of diethanolamine radical over the moles of the acid is in the range of a ratio of 1.2 moles of diethanolamine radical to 1 mole of acid radical, and a ratio of 1.5 moles of diethanolamine radical to 1 mole of acid.

19. In the process of claim 17, in which the ester content of the said reaction product is in excess of about 10%, and in which the said reaction at said reduced temperature is for a period of time to reduce the ester content to less than about 5% of said reaction mixture.

References Cited in the file of this patent

UNITED STATES PATENTS

| | | |
|---|---|---|
| 2,089,212 | Kritchevsky | Aug. 10, 1937 |
| 2,096,749 | Kritchevsky | Oct. 26, 1937 |
| 2,151,788 | Maursberger | Mar. 28, 1939 |
| 2,167,349 | DeGroote et al. | July 25, 1939 |
| 2,282,646 | DeGroote et al. | May 12, 1942 |
| 2,464,094 | Meade | Mar. 8, 1949 |
| 2,844,609 | Tesoro | July 22, 1958 |
| 2,863,888 | Schurman | Dec. 9, 1958 |

UNITED STATES PATENT OFFICE
CERTIFICATE OF CORRECTION

Patent No. 3,024,260                                                                           March 6, 1962

Robert Ernst

It is hereby certified that error appears in the above numbered patent requiring correction and that the said Letters Patent should read as corrected below.

Column 2, line 66, under "STAGE I" line 66, for "OHNH$_2$" read -- ROHNH$_2$ --; column 3, lines 7 to 12, the formula following the (IIIA) should appear as shown below instead of as in the patent:

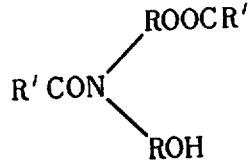

Signed and sealed this 2nd day of October 1962.

(SEAL)
Attest:

ERNEST W. SWIDER
Attesting Officer

DAVID L. LADD
Commissioner of Patents